(12) United States Patent
Bender et al.

(10) Patent No.: US 10,762,088 B2
(45) Date of Patent: *Sep. 1, 2020

(54) AUTOMATED DATABASE MANAGER

(71) Applicant: INTERNATIONAL BUSINESS MACHINES CORPORATION, Armonk, NY (US)

(72) Inventors: Michael Bender, Rye Brook, NY (US); Wayne M. Delia, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 15/851,877

(22) Filed: Dec. 22, 2017

(65) Prior Publication Data
US 2018/0121427 A1   May 3, 2018

Related U.S. Application Data

(63) Continuation of application No. 14/870,608, filed on Sep. 30, 2015, now Pat. No. 9,946,755.

(51) Int. Cl.
| | |
|---|---|
| *G06F 16/20* | (2019.01) |
| *G06F 16/2455* | (2019.01) |
| *G06Q 10/10* | (2012.01) |
| *G06F 16/28* | (2019.01) |
| *G06F 16/951* | (2019.01) |
| *G06F 16/23* | (2019.01) |

(52) U.S. Cl.
CPC ........ *G06F 16/24565* (2019.01); *G06F 16/23* (2019.01); *G06F 16/284* (2019.01); *G06F 16/951* (2019.01); *G06Q 10/10* (2013.01)

(58) Field of Classification Search
None
See application file for complete search history.

(56) References Cited

U.S. PATENT DOCUMENTS

| | | |
|---|---|---|
| 5,355,474 A | 10/1994 | Thuraisngham |
| 7,240,054 B2 | 7/2007 | Adiba et al. |
| 7,788,241 B2 | 8/2010 | Cheng et al. |

(Continued)

OTHER PUBLICATIONS

Wahid et al, XSDyM: An XML graphical conceptual model for static and dynamic constraints, Elsevier, Computer Standards & Interfaces, 2014.

(Continued)

*Primary Examiner* — Jau Shya Meng
(74) *Attorney, Agent, or Firm* — Patrick J. Daugherty; Daugherty & Del Zoppo Co., LPA

(57) ABSTRACT

Automated database managers identify each of a plurality of different constraints that are each individually active for a data operation on a data value of a table data field of a relational database for a data operation. A database manager processor selects an untested one of the plurality of constraints as a selected constraint, and tests a field data value of the table data field for a defined condition of the selected constraint. In response to the test of the field data value meeting the defined condition of the selected constraint, the processor performs the data operation on the data value of the table data field, without testing any other untested ones of the plurality of different constraints.

17 Claims, 6 Drawing Sheets

(56) References Cited

U.S. PATENT DOCUMENTS

| | | | |
|---|---|---|---|
| 7,873,671 B2 | 1/2011 | Barsness et al. | |
| 7,930,291 B2 | 4/2011 | Blaicher et al. | |
| 8,090,710 B2 | 1/2012 | Barsness et al. | |
| 8,108,367 B2 | 1/2012 | Konik et al. | |
| 8,572,574 B2 | 10/2013 | Ghosh et al. | |
| 8,972,460 B2 | 3/2015 | Das | |
| 2003/0093433 A1 | 5/2003 | Seaman | |
| 2010/0228706 A1* | 9/2010 | Labuda | G06F 16/2379 707/700 |
| 2011/0281554 A1* | 11/2011 | Mann | H04L 69/03 455/410 |
| 2011/0313999 A1 | 12/2011 | Bruno | |
| 2012/0198323 A1* | 8/2012 | Lier | G06F 9/451 715/226 |
| 2014/0032157 A1* | 1/2014 | Khiani | F24F 11/30 702/122 |
| 2015/0019484 A1 | 1/2015 | Mack | |
| 2015/0074069 A1 | 3/2015 | Baeuerle et al. | |

OTHER PUBLICATIONS

Peter Mell et al, The NIST Definition of Cloud Computing, National Institute of Standards and Technology, Special Publication 800-145, 2011.

U.S. Appl. No. 14/870,608, filed Sep. 30, 2015; GAU 2168, Confirmation No. 7405.

Notice of Allowance (dated Dec. 14, 2017) for U.S. Appl. No. 14/870,608, filed Sep. 30, 2015; GAU 2168, Confirmation No. 7405.

* cited by examiner

| Constraint Name | Table Name | Constraint Type | Hybrid Ref | Details |
|---|---|---|---|---|
| CONSTR1 | AMTWW.ENTERPRISE | Check Constraint | CONST5 | (field1 > 100 AND field2 <= 200) |
| CONSTR2 | AMTWW.ENTERPRISE | Foreign Key Constraint | CONST5 | (field3 must match foreign_field3 on remote table AMTWW.CROSSREF) |
| CONSTR3 | AMTWW.ENTERPRISE | Unique Constraint | | (field4 must be unique on table AMTWW.ENTERPRISE) |
| CONSTR4 | AMTWW.ENTERPRISE | Primary Key Constraint | | (field1, field2) must be unique and not null on table AMTWW.ENTERPRISE |
| CONSTR5 | AMTWW.ENTERPRISE | Hybrid Constraint | | Conditions of CONSTR1 or CONSTR2 must be satisfied. |

FIG. 6

AUTOMATED DATABASE MANAGER

BACKGROUND

Relational database manager devices and systems support business analytic application systems that contain database tables and other data objects defined to contain data (for example, views, indexes, triggers, counters, etc.). Constraints may be defined on data to be stored in the tables to prevent data errors, enable efficient and effective retrieval of data used in application programs, and ensure data consistency and integrity in associated applications. Data constraints may also be used to remove the need to provide custom code enforcement within each application program.

BRIEF SUMMARY

In one aspect of the present invention, a computer-implemented method for an automated database manager includes a processor that identifies each of a plurality of different constraints that are each individually active for a data operation on a data value of a table data field of a relational database for a data operation. The processor selects an untested one of the plurality of constraints as a selected constraint, and tests a field data value of the table data field for a defined condition of the selected constraint. In response to the test of the field data value meeting the defined condition of the selected constraint, the processor performs the data operation on the data value of the table data field, without testing any other untested ones of the plurality of different constraints.

In another aspect, a system has a hardware processor in circuit communication with a computer readable memory and a computer-readable storage medium having program instructions stored thereon. The processor executes the program instructions stored on the computer-readable storage medium via the computer readable memory and thereby identifies each of a plurality of different constraints that are each individually active for a data operation on a data value of a table data field of a relational database for a data operation. The processor selects an untested one of the plurality of constraints as a selected constraint, and tests a field data value of the table data field for a defined condition of the selected constraint. In response to the test of the field data value meeting the defined condition of the selected constraint, the processor performs the data operation on the data value of the table data field, without testing any other untested ones of the plurality of different constraints.

In another aspect, a computer program product for an automated database manager has a computer-readable storage medium with computer readable program code embodied therewith. The computer readable program code includes instructions for execution which cause the processor to identify each of a plurality of different constraints that are each individually active for a data operation on a data value of a table data field of a relational database for a data operation. The processor is further caused to select an untested one of the plurality of constraints as a selected constraint, and test a field data value of the table data field for a defined condition of the selected constraint. In response to the test of the field data value meeting the defined condition of the selected constraint, the processor is caused to perform the data operation on the data value of the table data field, without testing any other untested ones of the plurality of different constraints.

BRIEF DESCRIPTION OF THE DRAWINGS

These and other features of embodiments of the present invention will be more readily understood from the following detailed description of the various aspects of the invention taken in conjunction with the accompanying drawings in which:

FIG. 6 is a tabular illustration of an example of constraint definitions according to an aspect of the present invention.

DETAILED DESCRIPTION

Figure 1:
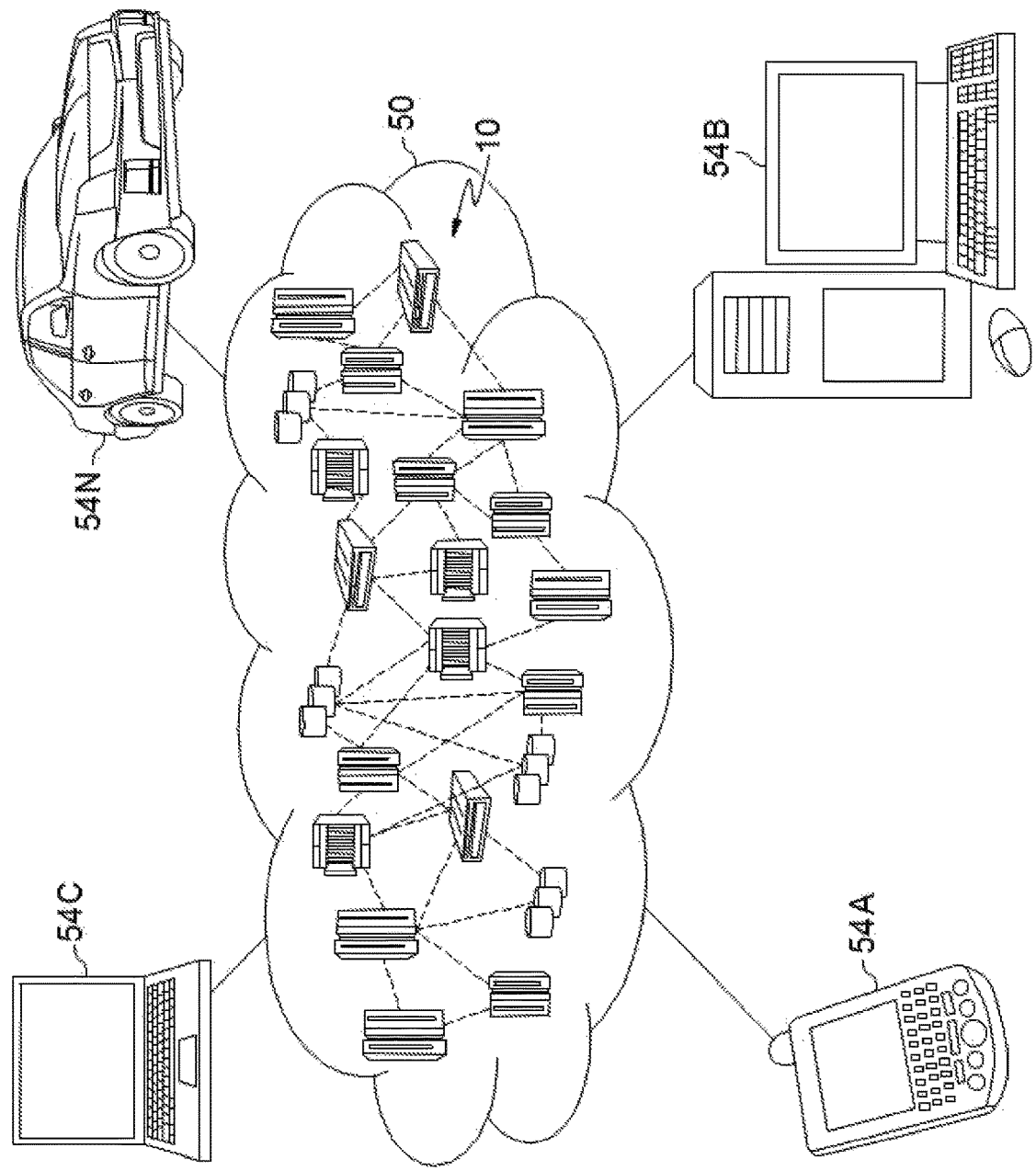
FIG. 1 depicts a cloud computing node according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
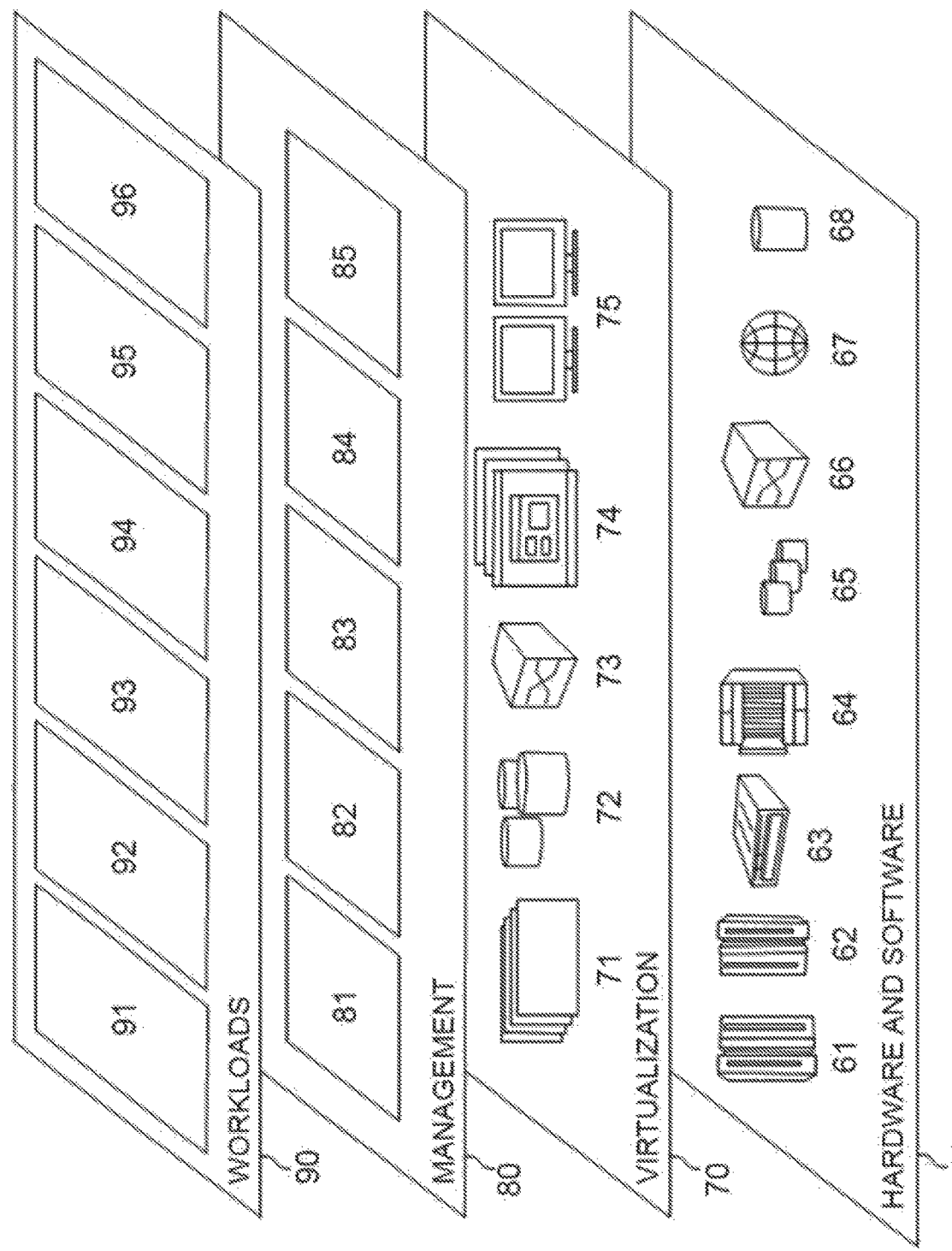
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 for an automated database manager that selectively applies different constraints of a hybrid constraint definition to a table data field of a relational database management system as described below.

Figure 3:
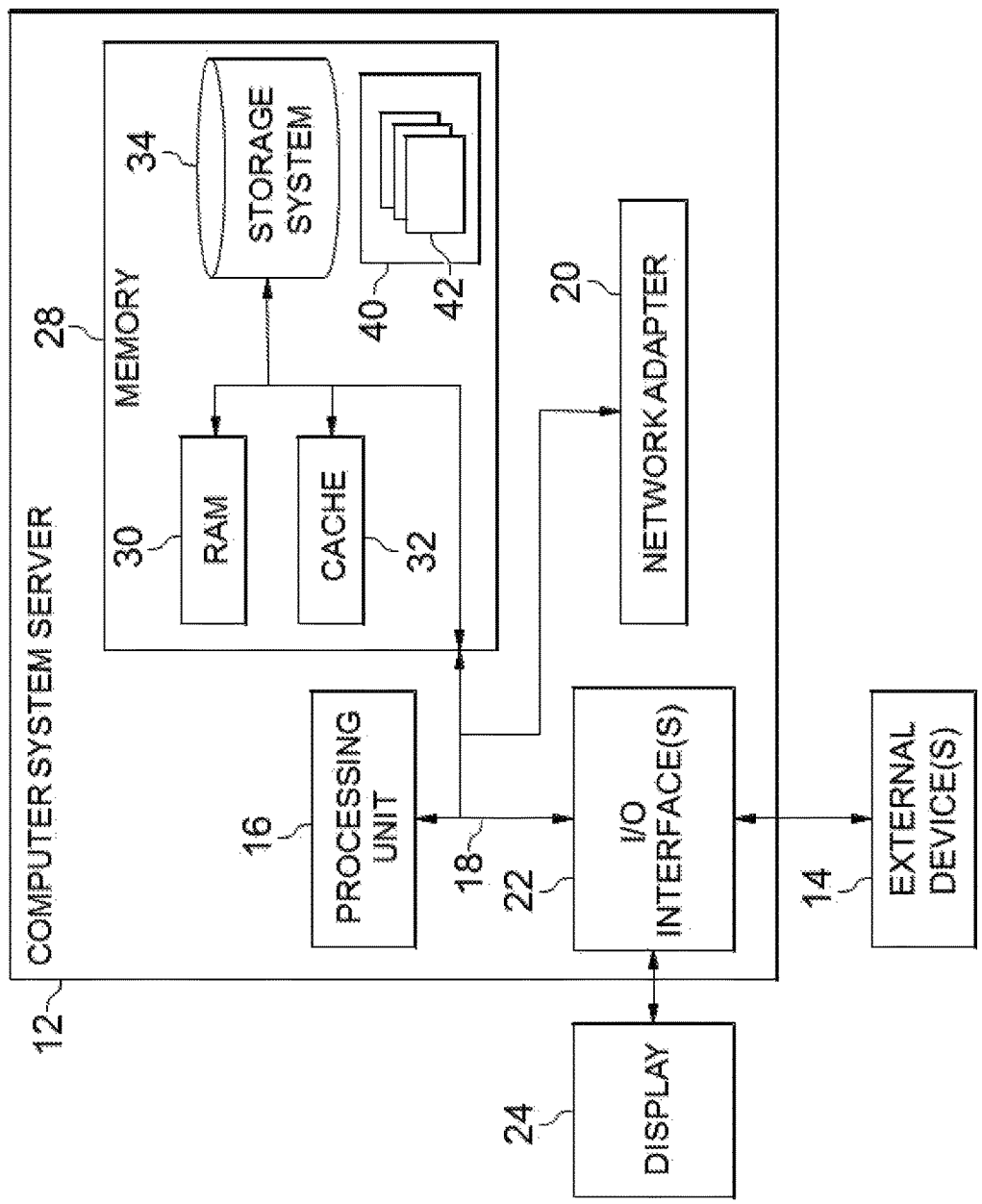
FIG. 3 depicts a computerized aspect according to an embodiment of the present invention.

FIG. 3 is a schematic of an example of a programmable device implementation 12 according to an aspect of the present invention, which may function as a cloud computing node within the cloud computing environment of FIG. 2. Programmable device implementation 12 is only one example of a suitable implementation and is not intended to suggest any limitation as to the scope of use or functionality of embodiments of the invention described herein. Regardless, programmable device implementation 12 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Data constraints are generally used to define conditions that must be met before field data values may be inserted, updated or deleted. For example, a "Check Constraint" is a first type of data constraint wherein a field data value is checked to see if it matches one or more restricted values in a list of acceptable values when the column or table is defined. "Foreign Key/Referential Integrity Constraints" (hereinafter sometimes referred to as a "Foreign Key Constraint") is a second type of data constraint wherein a field data value must match with a designated corresponding field in another table.

The implementation of data constraints may present problems in automated relational database manager devices and systems. Once a constraint is defined for data to be stored in a database tables, it is always enforced on any data records to be stored in the table. Problems arise in defining a combination of these two types of constraints on a single column in a table.

For example, it may be desirable to define constraint behavior for a particular column in a table to allow null values, but wherein if the data in the column field is not null, then only one of the Check Constraint and Foreign Key Constraint must be met, alternatively. This condition or definition may be defined by the following "OR" statement: non-null data in the column field must (i) be a specified default value, OR (ii) a non-default value must exist in a corresponding column field in another table.

However, under the prior art Check Constraint ensures that field data is among the defined list of restricted values and is always enforced when active. A Foreign Key constraint ensures the field data exists in a corresponding field in another table, and is also always enforced when active on a table location. Making both of these constraints active on a given field data item thus effectively results in an "AND" condition type that combines the restrictions of each constraint, instead of the desired "OR" condition described above.

While the prior art describes methods to perform each task separately, it does not provide for methods or techniques wherein a combination of these two constraints can be enforced in an alternative or "OR" condition on the same data field, though the imposition of both constraints on the same field is desirable in common programming tasks. Since prior art database manager cannot handle such alternative use of Check Constraints and Foreign Key/Referential Integrity Constraints, this type of enforcement is instead handled within an application program. However, this technique presents drawbacks and disadvantages. For example, several different application programs might need to update data on an affected table, and the enforcement of a combination of a Check Constraint conditions with the optional existence of the data value in another table needs to be coded in each and every application program. If the requirement is changed or removed, then each of these application programs must be modified.

Another prior art technique defines a completely separate reference table to contain a corresponding column that is populated with the valid check constraint values, along with the current values in the foreign table that are copied to this new reference table by the application code. Then, one foreign key is defined between the original table and the reference table. However, this approach has disadvantages in requiring necessary application coding changes, and it is slightly more complicated than the other, above-described prior art application coding problem. It also fails to permit the combination of two or more foreign key constraints in an OR relationship: in effect, a field value must be included in corresponding fields from two or more different tables using (foreign key 1) or (foreign key 2).

Aspects provide systems and methods for selectively applying different constraints to a table data field of a relational database management system, wherein a combination of the constraints can be enforced in an alternative or "OR" condition on the same data field. For example, FIG. 4 (or "FIG. 4") illustrates a computer implemented method or process of an aspect of the present invention wherein a processor (for example, a central processing unit (CPU)) executes code, such as code installed on a storage device in communication with the processor, and thereby performs the process step elements illustrated in FIG. 4.

At 102, a constraint system table is queried to identify a target table name and affected column name for a data operation that is an insert, update, or delete operation.

At 104 the processes determines whether any hybrid constraints according to the present invention are active for field data values of the target table column for the data operation. For example, does an active constraint have a non-null hybrid constraint name as a value in a hybrid reference system table field, such as in a HYBRID_REF system table field, though other naming values may be practiced.

If not, then the operation proceeds via conventional processing, wherein each and every active constraint that is not a hybrid constraint is evaluated at 106, and the data operation is performed at 110 only if at 108 all of the evaluated, non-hybrid constraints are set to logical TRUE in response to the data value meeting the conditions defined for the constraint (effectively meeting an AND condition for the logical TRUE values for all of said individual constraints). Otherwise, if the data value fails to meet the conditions of any of the evaluated non-hybrid constraints, this results in setting the value of said unsatisfied constraint to logical FALSE, which fails to the satisfy the condition at 108 and accordingly the data operation fails at 112.

However, any constraints that are active for field data values of the target table column for the data operation and have a non-null hybrid constraint name as a value in a hybrid reference system table field at 104 are treated as "hybrid constraints," wherein at 114 a plurality of different constraints that are defined within a definition statement of the non-null hybrid constraint name are identified.

At 116 an untested one of the plurality constraints within the hybrid constraint definition statement constraint is selected, the field data value of the target table column is evaluated (tested) for defined conditions of the selected constraint, and a logical value of the selected constraint is set to TRUE if the field data value meets said tested constraint conditions, otherwise the value is left as FALSE if the field data value does not meet said tested constraint conditions. (This assumes that the values of the constraints are initialized to FALSE, and are set to TRUE only if evaluated and their conditions are met; still other logical settings may be practiced, and this example is illustrative but not limiting or exhaustive.)

At 118 the logical values of all of the constraints defined within the non-null hybrid constraint name definition statement are combined in an OR operation or statement. If the OR output is TRUE (hence, that at least one tested constraint of the constraints in the hybrid constraint name definition statement has been evaluated and is satisfied), then no further evaluations are performed with respect to any remaining, untested ones of the constraints defined within the non-null hybrid constraint name definition statement, but instead the data operation (as requested at 102) is performed on the target table column at 110.

Else, if at 118 the output of the OR operation is FALSE, then at 120 the process determines whether each of the constraints defined within the non-null hybrid constraint name definition statement has been tested. If not, then the process returns to 116 to select and evaluate another, untested one of the hybrid constraint definition statement constraints.

Thus, the process iteratively steps through and tests one each of the constraints identified within the hybrid constraint name definition statement until a first one is satisfied (is set to logical TRUE), wherein the process may proceed immediately to performing the associated data operation on the target location, without unnecessarily expending processing resources on evaluating any other ones of the constraints of the hybrid constraint. If determined at 120 that all of the hybrid definition constraints have been tested and the OR value is FALSE at 118, then none of the constraints identified within the hybrid constraint name definition statement have been satisfied and the data operation fails at 112.

Figure 4:
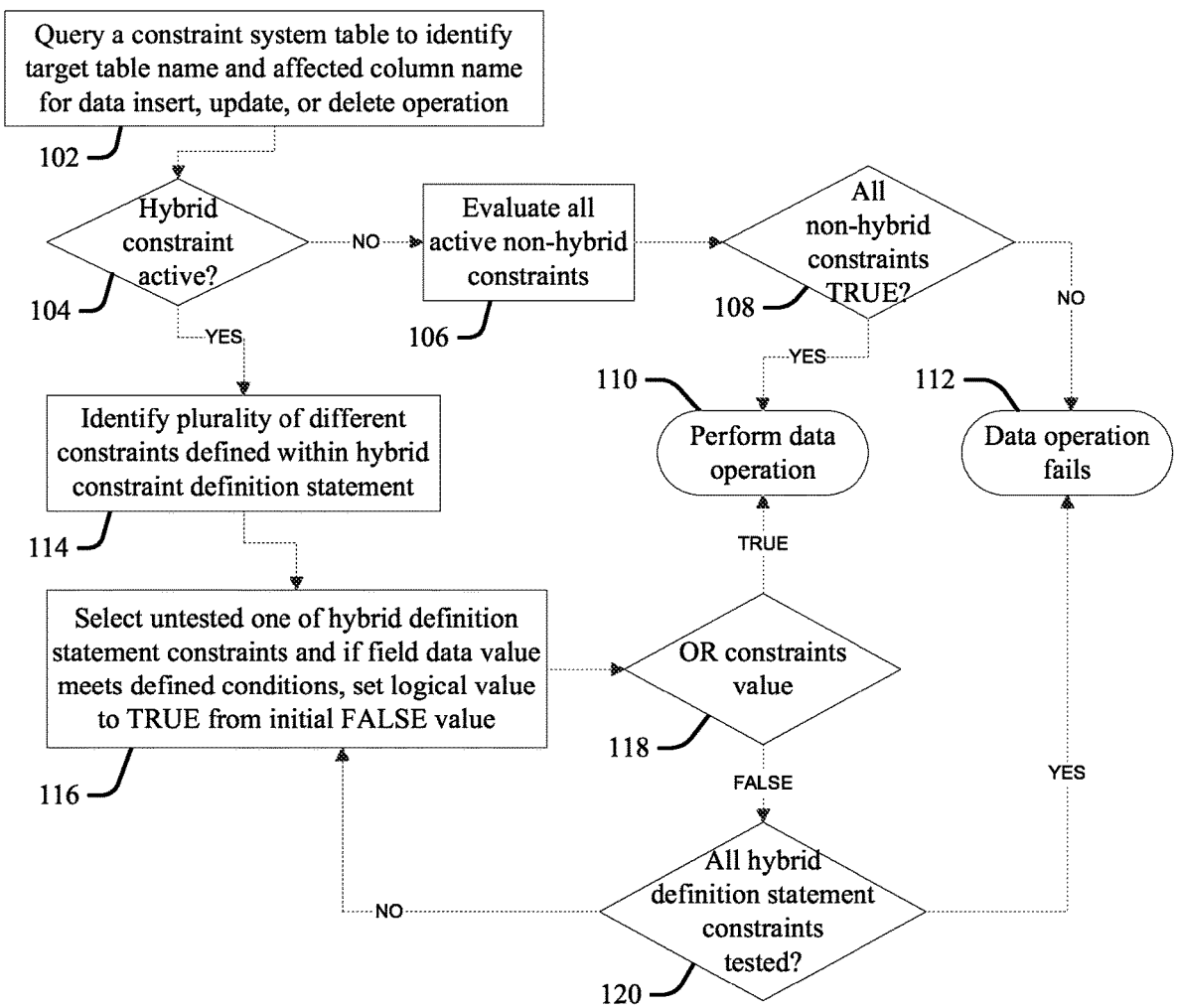
FIG. 4 is a flow chart illustration of a method or process according to an embodiment of the present invention for an automated database manager that selectively applies different constraints of a hybrid constraint definition to a table data field of a relational database management system.

In the process and system of FIG. 4 an automated database relational manager queries a constraint system table to determine the table name and affected column name for a proposed data insert, update, or delete operation, and if there are constraints related to a particular column in a target table, and these constraints have a non-null Hybrid Constraint name as a value in the HYBRID_REF system table field, then these constraints are individually tested, with the results combined in a logical "OR" chain to determine if at least one of the constraint components in the Hybrid Constraint definition is satisfied.

Figure 5:
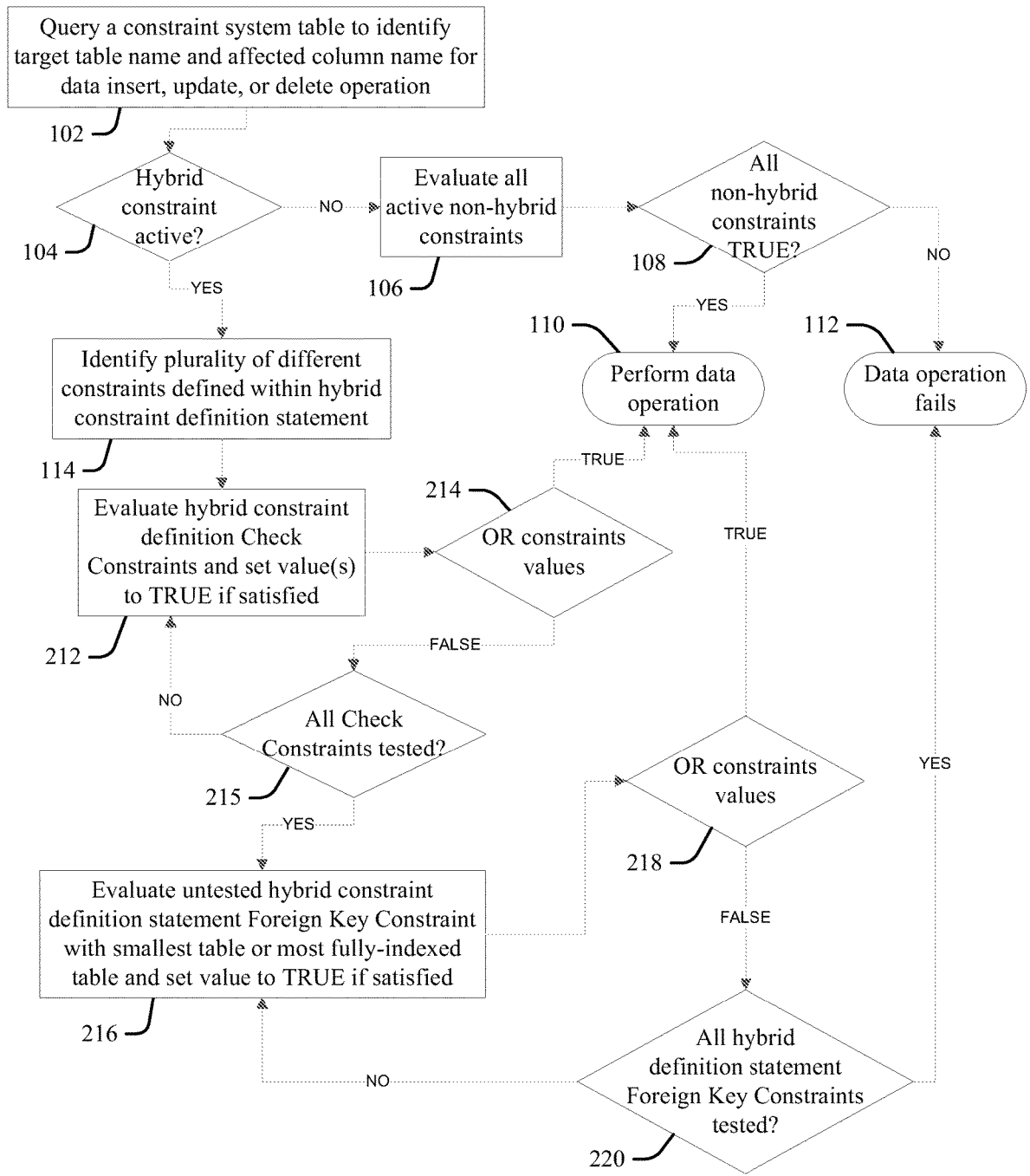
FIG. 5 is a flow chart illustration of another method or process according to an embodiment of the present invention for an automated database manager that selectively applies different constraints of a hybrid constraint definition to a table data field of a relational database management system.

FIG. 5 illustrates an alternative embodiment according to the present invention that provides advantages over the prior art in data-intensive, high speed Business Analytics database operations, wherein the hybrid constraint definition statement comprises Check Constraints and Foreign Key Constraints. The steps 102, 104, 106, 108, 110 and 112 of FIG.

5 are similar to those described above with respect to FIG. 4. If determined at 104 that the constraints have a non-null hybrid constraint name as a value in a hybrid reference system table field, then an order of conditional testing is imposed on the constraints identified within the hybrid constraint name definition statement at 114. Thus, at 212 any Check Constraints of the hybrid constraint are evaluated first, the process iteratively testing and evaluating these constraints, one at time, at 212, 214 and 215, until any of the Check Constraints are satisfied (where their logical values are set to TRUE at 212 from their initialized FALSE state), and the output of the OR combination of all constraints defined within hybrid constraint definition statement is TRUE at 214, wherein no further no further evaluations are performed with respect to any Foreign Key Constraints or any other remaining, untested constraints defined within the non-null hybrid constraint name definition statement, and instead the data operation (as requested at 102) is performed on the target table column at 110.

However, once all Check Constraints are tested and are not satisfied at 214 and 215, then at 216 a Foreign Key Constraint defined within hybrid constraint definition statement that has the smallest table or most fully-indexed table relative to tables of the other untested Foreign Key Constraints defined within said hybrid constraint definition statement is selected and evaluated. An OR output is generated at 218 from all logical values of the constraints of the hybrid constraint definition statement, and if TRUE (which would be the result if the Foreign Key Constraint with the smallest or most fully-indexed table evaluated at 216 was satisfied and set to TRUE), then no further Foreign Key Constraint evaluations are performed with respect to any remaining, untested ones of the constraints defined within the non-null hybrid constraint name definition statement, but instead the data operation (as requested at 102) is performed on the target table column at 110. Once all remaining constraints within the hybrid definition are tested, namely the remaining Foreign Key Constraint, as determined at 220, and the value of an OR statement of all of the constraints is FALSE at 218, then none of the constraints identified within the hybrid constraint name definition statement have been satisfied and the data operation fails at 112.

Thus, the process of FIG. 5 iteratively performs and individually evaluates each as-yet untested Foreign Key Constraints at 216 in order of their relative table size or indexing, choosing the one with smallest or most fully-indexed table each time at 216, stopping as soon as one of them is satisfied and set to logical TRUE. This process thereby efficiently and iteratively evaluates Foreign Key Constraints from fastest/easiest evaluation to slowest/hardest, with relatively larger or more poorly-indexed tables progressively evaluated after the more efficiently performed Foreign Key Constraints are evaluated. That way, a full search on a large and/or poorly-indexed table in evaluation of a Foreign Key Constraints may be avoided as unnecessary and not performed at 216, saving resources and improving efficiencies, over prior art methods that require the evaluation of all active constraints, and in particular of those with larger and/or more poorly organized tables.

Generally there may be a smaller performance loss using database manager techniques against small tables (for example, defined as less than 1000 records), even if poorly- or non-indexed, so they will take processing preference at 216 over larger tables regardless of the quality of the indexes on the large tables. Thus, in some aspects if there's a choice at 216 between examining a small table and a large table, the small table is examined first, because the search overhead will be negligible regardless of whether there is or isn't an immediate "hit". However, it will be appreciated that the threshold for distinguishing small table sizes from large table sizes is dependent upon available database manager techniques and processing resources, and the present example is illustrative but not exhaustive.

In some aspects of FIG. 5 a relational database manager's query optimizer is used to indicate what order the constraints within the hybrid constraint definition are evaluated. As an example, suppose a Hybrid Constraint has these components: check if Field1=0, check if Field2 is null, check if Field3 is found on remote Table3 in column Col3, and check if Field4 is found on remote Table4 in column Col4. Data from a query optimizer may indicate at 216 that Table3 has several million records and is poorly indexed, and that Table4 has only a few hundred records, with Col4 fully indexed. Based on this information from the query optimizer, the Hybrid Constraint is evaluated in the following order:

A) Check at $1^{st}$ iteration of 212 to see if the value of Field1 is 0.

B) Check at subsequent, $2^{nd}$ iteration of 212 to see if the value of Field2 is null.

C) Check at $1^{st}$ iteration or 216 to see if the value of Field4 is found in well-indexed Col4 in small table Table4.

D) Check at $2^{nd}$, subsequent iteration of 216 to see if the value of Field3 is found in poorly-indexed Col3 in very large table Table3.

Thus, while the requirement of combination of two or more Check Constraints in the same data operation may be constructed in the prior art by logically joining the check conditions, aspects of the present invention enable combining two or more Foreign Key Constraints onto a single field in an OR relationship in a fashion that is unavailable in prior art techniques, wherein in effect "the field values of column COL1 in table TABLE1 must be included either in column COL2 of table TABLE2, or in column COL3 of table TABLE3."

Definition of the Hybrid Constraint.

Relational database manager syntax allows aspects of the present invention to define the hybrid combination of constraints during table creation, or they may be added to a column as part of an alteration to an already existing table. The definition of a hybrid constraint may take a same or similar form, making use of previously defined Check Constraints or Foreign Key Constraints. For example, definition statements in prior art DB2® implementations with respect to the Check Constraints and the Foreign Key Constraints include the following: "[ALTER TABLE <table-name> ADD] CONSTRAINT <constraint-name> CHECK (<condition-list>)" and "[ALTER TABLE <table-name> ADD] CONSTRAINT <constraint-name> FOREIGN KEY REFERENCES <ref-table-name> (column)". (DB2 is a trademark of International Business Machines Corporation in the United States or other countries.)

In one aspect of the present invention a hybrid constraint is defined as follows: "[ALTER TABLE <table-name> ADD] CONSTRAINT <constraint-name> HYBRID (<constraint-1-name> OR <constraint-2-name>[OR <more-constraint-names>])". In this example of a definition statement, <constraint-1-name>, <constraint-2-name>, and all other provisionally-enforced constraints are already previously defined, though they may also be defined with a system-generated name "on the fly" during definition of the hybrid constraint. It will be understood that the material within brackets of this example is optional or otherwise dependent on how the constraint definition is issued. If the constraint definition as a stand-alone DB2 command, the terms "ALTER TABLE <table-name> ADD" are included at the front of the query; however, if part of a table definition, then these terms are omitted.

Storage of Hybrid Constraint Definition in System Tables.

The components of Check Constraints and Foreign Key Constraints are conventionally stored in relational database manager system control tables, identifying the name of the constraint, along with the names of parent tables, child tables, and columns affected. In contrast, according to the present invention when a Check Constraint or a Foreign Key Constraint is included as part of the definition of a hybrid constraint, a HYBRID_REF indicator field in the component constraint definition records is updated on the system control table. This identifies to the relational database manager that the Check Constraint or Foreign Key Constraint is not to be fully and exclusively enforced when data is added, modified, or removed from the affected table. Instead, all component parts making up the hybrid constraint will be conditionally tested, and data modification of the table will be permitted as long as one or more of the hybrid constraint components is logically satisfied (for example, set to logical TRUE in response to evaluation).

When a hybrid constraint is dropped, the HYBRID_REF indicator field in the component constraint definition records is reset to null, indicating that the defined, constituent Check Constraints or Foreign Key References components are now no longer part of the hybrid constraint, and will be exclusively enforced unless and until the component constraints are themselves dropped.

FIG. 6 is a tabular illustration of an example of constraint definitions for use in inserting records into a relational database table entitled "AMTWW.ENTERPRISE" that has a structure definition according to the following statements:

```
CREATE TABLE AMTWW.ENTERPRISE (
    FIELD1 smallint not null,
    FIELD2 smallint not null,
    FIELD3 varchar(16) not null,
    FIELD4 integer,
    PRIMARY KEY (FIELD1, FIELD2),
    UNIQUE (FIELD4),
    CONSTRAINT CONSTR1 CHECK (FIELD1 > 100 AND FIELD2
    <=200),
    CONSTRAINT CONSTR1 FOREIGN KEY CONSTR2 (FIELD3)
    REFERENCES AMTWW.CROSSREF (FOREIGN_FIELD3),
    CONSTRAINT CONSTR5 HYBRID (CONSTR1 OR CONSTR2)
    );
```

The following use case examples provide illustrative but not limiting or exhaustive examples of implementations of aspects of the present invention.

Use Case Example 1

The statement "INSERT INTO AMTWW.ENTERPRISE VALUES (95, 190, 'EMEA', 11111)" is executed as follows:

Assume the primary key and unique constraints are satisfied.

Columns FIELD1, FIELD2, and FIELD3 are part of a Hybrid Constraint named CONSTR5.

Hybrid Constraint CONSTR5 is made up of components Check Constraint CONSTR1 and Foreign Key Constraint CONSTR2.

Check Constraint CONSTR1 requires FIELD1>100 and FIELD2<=200.

Since FIELD1=90, Check Constraint CONSTR1 fails.

Even though Check Constraint CONSTR1 fails, Foreign Key Constraint CONSTR2 will be tested.

Assume the field value of 'EMEA' is found in column FOREIGN_FIELD3 in table AMTWW.CROSSREF.

Foreign Key Constraint CONSTR2 is satisfied, and returns a successful result. Therefore, Hybrid Constraint CONSTR5, consisting of components CONSTR1 (failed) OR CONSTR2 (succeeded) succeeds, and the record is written to the AMTWW.ENTERPRISE table on the database.

Use Case Example 2

The statement "INSERT INTO AMTWW.ENTERPRISE VALUES (110, 190, 'BOGUS', 22222)" is executed as follows:

Assume the primary key and unique constraints are satisfied.

Columns FIELD1, FIELD2, and FIELD3 are part of Hybrid Constraint CONSTR5.

Hybrid Constraint CONSTR5 is made up of components Check Constraint CONSTR1 and Foreign Key Constraint CONSTR2.

Check Constraint CONSTR1 requires FIELD1>100 and FIELD2<=200.

Since FIELD1=110 and FIELD2=190, Check Constraint CONSTR1 succeeds.

Since Check Constraint CONSTR1 succeeded, Foreign Key Constraint CONSTR2 will not be tested. Therefore, Hybrid Constraint CONSTR5, consisting of components CONSTR1 (succeeded) OR CONSTR2 (doesn't matter) succeeds, and the record is written to the AMTWW.ENTERPRISE table on the database.

Use Case Example 3

The statement "INSERT INTO AMTWW.ENTERPRISE VALUES (125, 210, 'BOGUS', 33333)" is processed as follows:

Assume the primary key and unique constraints are satisfied.

Columns FIELD1, FIELD2, and FIELD3 are part of Hybrid Constraint CONSTR5.

Hybrid Constraint CONSTR5 is made up of components Check Constraint CONSTR1 and Foreign Key Constraint CONSTR2.

Check Constraint CONSTR1 requires FIELD1>100 and FIELD2<=200.

Since FIELD1=125 (OK) and FIELD2=210 (fails), Check Constraint CONSTR1 fails.

Even though Check Constraint CONSTR1 fails, Foreign Key Constraint CONSTR2 will be tested.

Assume the field value of 'BOGUS' is not found in column FOREIGN_FIELD3 in table AMTWW.CROSSREF.

Foreign Key Constraint CONSTR2 is not satisfied, and returns a failure result.

Therefore, Hybrid Constraint CONSTR5, consisting of components CONSTR1 (failed) OR CONSTR2 (failed) also fails. Accordingly, the record is not written to the AMTWW.ENTERPRISE table on the database.

Thus, aspects of the present invention provide advantages in that combinations of active constraints may be evaluated in the alternative, rather than requiring the evaluation of all, an option that is not available in the management of active constraints under current relational database management systems. This enables an automated database manager process to perform the alternative checks, without relying on any application programming. This permits acceptance of an inserted record in the use case examples 1) and 2) described above, where a simple combination of two always-enforced constraints would not permit those records to be written under prior art techniques.

Enabling the ability to define, change, or remove a hybrid combination of Check Constraint and Foreign Key/Referential Integrity Constraint also eliminates the need imposed by the prior art for extensive code modifications to overcome the lack of the hybrid combination capability in the relational database manager. Aspects of the present invention also enable the combination of two or more foreign key constraints in an OR relationship, without requiring the inclusion of a field value in corresponding fields from two or more different tables (such as by using (foreign key 1) or (foreign key 2)).

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for an automated database manager, the method comprising executing on a computer processor the steps of:
   identifying, by a processor, each of a plurality of different constraints that are each individually active for a data operation on a data value of a table data field of a relational database for a data operation;
   querying a constraint system table to identify a target table name and an affected column name for the data operation;
   determining whether a first constraint name that is active for the field data values of the target table name and the affected column name for the data operation has a non-null hybrid constraint name as a value in a hybrid reference system table field;
   in response to determining that the active first constraint name has the non-null hybrid constraint name as the value in a hybrid reference system table field, identifying the active first constraint name as a hybrid constant name, and selecting a plurality of constraints that are each defined within a definition statement of the hybrid constraint name and stored as a constraint definition statement in another reference system table field;
   selecting an untested one of the plurality of constraints as a selected constraint;
   testing a field data value of the table data field for a defined condition of the selected constraint; and
   in response to the testing of the field data value meeting the defined condition of the selected constraint, performing the data operation on the data value of the table data field without testing any other untested ones of the plurality of different constraints.

2. The method of claim 1, further comprising:
   in response to the testing of the field data value failing to meet the defined condition of the selected constraint, iteratively selecting others of the untested ones of the plurality of constraints as an updated selected constraint and testing a field data value of the table data field for a defined condition of the updated selected constraint, until:
   performing the data operation on a data value of the table data field of one of the updated selected constraints, without testing any other untested ones of the plurality of different constraints, in response to determining that the tested field data values of the table data field for the defined condition of the one of the updated selected constraints meets the defined condition of the updated selected constraint; or
   failing the data operation in response to determining that an entirety of the untested ones of the plurality of constraints are selected as the updated selected constraint, and none of the tested field data values meet defined conditions of the updated selected constraints.

3. The method of claim 1, further comprising:
   integrating computer-readable program code into a computer system comprising the processor, a computer readable memory in circuit communication with the processor, and a computer readable storage medium in circuit communication with the processor; and
   wherein the processor executes program code instructions stored on the computer-readable storage medium via the computer readable memory and thereby performs the identifying each of the plurality of different constraints, the querying the constraint system table, the determining whether the first constraint name that is active for the field data values of the target table name and the affected column name for the data operation has the non-null hybrid constraint name as the value in a hybrid reference system table field, the identifying the active first constraint name as the hybrid constant name, the selecting the plurality of constraints, the selecting the untested one of the plurality of constraints as the selected constraint, the testing the field data value of the table data field for the defined condition of the selected constraint, and the performing the data operation on the data value of the table data field without testing any other untested ones of the plurality of different constraints in response to the testing of the field data value meeting the defined condition of the selected constraint.

4. The method of claim 3, further comprising:
providing the integrated computer-readable program code as a service in a cloud environment.

5. The method of claim 1, wherein the data operation is selected from the group consisting of an insert operation, an update operation, and a delete operation.

6. The method of claim 5, further comprising:
in response to determining that a hybrid constraint name is active for field data values of a target table name and an affected column name for the data operation, identifying each of the plurality constraints that are each individually active for the field data values of the target table name and the affected column name for the data operation within a definition statement for the hybrid constraint name as the untested ones of the plurality constraints.

7. The method of claim 5, wherein the plurality of different constraints identified within the definition statement for the hybrid constraint as the untested ones of the plurality constraints comprises a check constraint and a foreign key constraint.

8. The method of claim 7, wherein selecting untested ones of the plurality of constraints comprises:
selecting any of untested ones of check constraints; and
selecting any of untested ones of foreign key constraints, in response to selecting and testing an entirety of check constraints within the plurality of untested constraints.

9. The method of claim 8, wherein the plurality of untested constraints comprises a plurality of foreign key constraints; and
wherein selecting untested ones of the plurality of constraints comprises:
selecting any of untested ones of the foreign key constraints in order of their relative table size or indexing, by choosing one with smaller or more fully-indexed table over others of the untested ones of the foreign key constraints.

10. The method of claim 9, wherein the selecting any of the untested ones of the foreign key constraints in order of their relative table size or indexing comprises:
selecting ones of the foreign key constraints that have smaller tables over others that have larger tables; and
selecting ones of the foreign key constraints that have larger tables that are relatively more indexed over others that have larger tables.

11. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
identifies each of a plurality of different constraints that are each individually active for a data operation on a data value of a table data field of a relational database for a data operation;
queries a constraint system table to identify a target table name and an affected column name for the data operation;
determines whether a first constraint name that is active for the field data values of the target table name and the affected column name for the data operation has a non-null hybrid constraint name as a value in a hybrid reference system table field;
in response to determining that the active first constraint name has the non-null hybrid constraint name as the value in a hybrid reference system table field, identifies the active first constraint name as a hybrid constant name, and selects a plurality of constraints that are each defined within a definition statement of the hybrid constraint name and stored as a constraint definition statement in another reference system table field;
selects an untested one of the plurality of constraints as a selected constraint;
tests a field data value of the table data field for a defined condition of the selected constraint; and
in response to the test of the field data value meeting the defined condition of the selected constraint, performs the data operation on the data value of the table data field, without testing any other untested ones of the plurality of different constraints.

12. The system of claim 11, wherein the processor executes the program instructions stored on the computer-readable storage medium via the computer readable memory and thereby further:
in response to the test of the field data value failing to meet the defined condition of the selected constraint, iteratively selects others of the untested ones of the plurality of constraints as an updated selected constraint and tests a field data value of the table data field for a defined condition of the updated selected constraint, until:
performing the data operation on a data value of the table data field of one of the updated selected constraints, without testing any other untested ones of the plurality of different constraints, in response to determining that the tested field data values of the table data field for the defined condition of the one of the updated selected constraints meets the defined condition of the updated selected constraint; or
failing the data operation, in response to determining that an entirety of the untested ones of the plurality of constraints are selected as the updated selected constraint, and none of the tested field data values meet defined conditions of the updated selected constraints.

13. The system of claim 12, wherein the data operation is selected from the group consisting of an insert operation, an update operation, and a delete operation; and
wherein the processor executes the program instructions stored on the computer-readable storage medium via the computer readable memory and thereby, in response to determining that a hybrid constraint name is active for field data values of a target table name and an affected column name for the data operation, identifies each of the plurality constraints that are each individually active for the field data values of the target table name and the affected column name for the data operation within a definition statement for the hybrid constraint name as the untested ones of the plurality constraints.

14. The system of claim 13, wherein the plurality of different constraints identified within the definition statement for the hybrid constraint as the untested ones of the plurality constraints comprises a check constraint and a foreign key constraint; and
wherein the processor executes the program instructions stored on the computer-readable storage medium via the computer readable memory and thereby selects untested ones of the plurality of constraints by:

selecting any of untested ones of check constraints; and
selecting any of untested ones of foreign key constraints, in response to selecting and testing an entirety of check constraints within the plurality of untested constraints.

15. A computer program product for an automated database manager, the computer program product comprising:
a computer readable storage medium having computer readable program code embodied therewith, wherein the computer readable storage medium is not a transitory signal per se, the computer readable program code comprising instructions for execution by a processor that cause the processor to:
identify each of a plurality of different constraints that are each individually active for a data operation on a data value of a table data field of a relational database for a data operation;
query a constraint system table to identify a target table name and an affected column name for the data operation;
determine whether a first constraint name that is active for the field data values of the target table name and the affected column name for the data operation has a non-null hybrid constraint name as a value in a hybrid reference system table field;
in response to determining that the active first constraint name has the non-null hybrid constraint name as the value in a hybrid reference system table field, identify the active first constraint name as a hybrid constant name, and select a plurality of constraints that are each defined within a definition statement of the hybrid constraint name and stored as a constraint definition statement in another reference system table field;
select an untested one of the plurality of constraints as a selected constraint;
test a field data value of the table data field for a defined condition of the selected constraint; and
in response to the test of the field data value meeting the defined condition of the selected constraint, perform the data operation on the data value of the table data field, without testing any other untested ones of the plurality of different constraints.

16. The computer program product of claim 15, wherein the computer readable program code instructions for execution by the processor further cause the processor to:
in response to the test of the field data value failing to meet the defined condition of the selected constraint, iteratively select others of the untested ones of the plurality of constraints as an updated selected constraint and test a field data value of the table data field for a defined condition of the updated selected constraint, until:
performing the data operation on a data value of the table data field of one of the updated selected constraints, without testing any other untested ones of the plurality of different constraints, in response to determining that the tested field data values of the table data field for the defined condition of the one of the updated selected constraints meets the defined condition of the updated selected constraint; or
failing the data operation, in response to determining that an entirety of the untested ones of the plurality of constraints are selected as the updated selected constraint, and none of the tested field data values meet defined conditions of the updated selected constraints.

17. The computer program product of claim 16, wherein the data operation is selected from the group consisting of an insert operation, an update operation, and a delete operation; and
wherein the computer readable program code instructions for execution by the processor further cause the processor to, in response to determining that a hybrid constraint name is active for field data values of a target table name and an affected column name for the data operation, identify each of the plurality constraints that are each individually active for the field data values of the target table name and the affected column name for the data operation within a definition statement for the hybrid constraint name as the untested ones of the plurality constraints.

* * * * *